United States Patent Office 3,708,296
Patented Jan. 2, 1973

3,708,296
PHOTOPOLYMERIZATION OF EPOXY MONOMERS
Sheldon Irwin Schlesinger, Hightstown, N.J., assignor to American Can Company, New York, N.Y.
No Drawing. Filed Aug. 20, 1968, Ser. No. 753,869
Int. Cl. G03c 1/70
U.S. Cl. 96—33
27 Claims

ABSTRACT OF THE DISCLOSURE

A process for polymerizing epoxy monomers which comprises mixing with epoxy monomers photosensitive aryldiazonium compounds and thereafter subjecting the resulting mixture to actinic radiation. The aryldiazonium compounds decompose to produce a polymerization initiator in the form of a Lewis acid, thereby catalyzing the polymerization of the monomer to the polymer. Examples of photosensitive compounds useful in the process are p-nitrobenzenediazonium hexafluorophosphate, p-N-morpholinobenzenediazonium hexafluoroarsenate, and 2,4-dichlorobenzenediazonium hexachloroantimonate.

BACKGROUND OF THE INVENTION

This invention relates to a process for polymerizing epoxy monomers and more particularly to a process for effecting the photopolymerization of epoxy monomers by use of organic compounds which are photosensitive and release an active catalyst upon exposure to radiation. The phrase "epoxy monomer or prepolymer," and in general the term epoxy monomer itself, in the description of this invention and the appended claims hereto are meant to include any molecule containing one or more 1,2-epoxy or oxirane rings, whether the molecule consists of a small grouping of atoms or of a chain of repeating units as in commercial resins. Thus, this invention includes the treatment of commercial epoxy resins, sometimes referred to as prepolymers, which consists of smaller molecular units which have been linked together to give longer chains with pendant epoxy groups which are capable of further polymerization. All of the epoxy compounds treated in the present invention regardless of whether they are referred to as monomers, resins or prepolymers will contain the 1,2-epoxy or oxirane ring structure

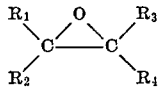

which will be identified hereinafter as an epoxy ring and where $R_1$, $R_2$, $R_3$, and $R_4$ can be alkyl, aryl, alkoxy, alkenyl, and hydrogen.

In order to effect the polymerization of the above defined monomers, it is necessary to open the epoxy ring through cleavage of a carbon-oxygen bond. A reactive intermediate is then formed, which can subsequently open up another epoxy ring. This reaction may repeat itself many times in a chain reaction to form a polymer of repeating ether units.

Previously, isolated instances have been reported in the literature wherein epoxy monomers have been polymerized by the action of electromagnetic radiation. This can be achieved by selecting a region of the electromagnetic spectrum providing actinic radiation to which the monomer responds to form an initiating species that causes the polymer chain to grow. For example, Penezek et al. in Die Makromolekular Chemie, 97 (1966) have reported that gamma radiation will effect polymerization of cyclohexene oxide, an epoxy monomer. However, this type of reaction does not generally occur with most epoxy monomers and additionally gamma radiation is not a convenient source of radiation and not as useful as the ultraviolet and visible region of the spectrum. Therefore, heretofore polymerization of epoxy monomers has been carried out by heating the monomer in which a chemical compound was incorporated, until catalysts contained therein were activated. The activation of the catalyst upon heating thereby initiated polymerization of the epoxy monomers.

These methods, though successful, are unsatisfactory in that careful attention must be given to staying within the temperature limitations of the system involved. In order to prevent the harmful effects of heat curing, it is often necessary to extend the curing cycle an unreasonable length of time.

Recently workers in the art have discovered a method wherein some of the above deficiencies are overcome. See for example U.S. Pat. 3,205,157. Briefly, this method proposes the use of aryldiazonium fluoroborate compounds as photosensitvie agents, which upon exposure to radiation release an active catalyst which initiates the polymerization of epoxy monomers to produce epoxy polymers. However, photosensitive compounds disclosed by the prior art tend to be chemically instable resulting in the disdvantages of extremely short pot life and being potentially explosively hazardous. Additionally, epoxy monomer systems catalyzed with the photosensitive compounds of the prior art have been found to be poorly-receptive to ink, a critical property in the field of graphic arts. Furthermore, unexpectedly it has been discovered that the catalyst activity and resulting usefulness of aryldiazonium compounds cannot be determined on a random basis. Moreover, it has been unexpectedly discovered that many aryldiazonium compounds do not possess the requisite properties necessary to catalyze the wide variety of epoxy monomers previously defined herein. Accordingly, it is desirable to identify and discover new and improved epoxy monomer catalyzing agents useful in the photopolymerization process which are not subject to and overcome the deficiencies now existing in the art.

SUMMARY OF THE INVENTION

Accordingly, a new and improved class of aryldiazonium compounds has been discovered which upon admixture with an epoxy monomer or prepolymer (which may be a resin) and subsequent exposure to actinic radiation release an active catalyst which effects the polymerization of the epoxy monomer. This new class of photosensitive compounds possesses the properties of increased speed and efficiency in catalyzing polymerization and in yielding epoxy polymers which are receptive to ink and possess inherent superior toughness, abrasion resistance, adhesion to metal surfaces, and resistance to chemical attack.

The photosensitive compounds of the present invention can be defined by the following formula:

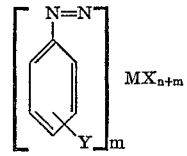

where $MX_{n+m}$ is a halogen containing complex anion selected from the group consisting of hexachlorostannate IV, tetrachloroferrate III, hexafluorophosphate, hexafluoroarsenate V, hexachloroantimonate V, hexafluoroantimonate V and pentachlorobismuthate (III); and Y is selected from at least one of the group consisting of nitro, halogen, N-morpholino, alkyl, alkoxy, aryl, amino, arylamino, alkylamino and arylmercapto (arylthio) radicals, indicating the variety of substituted aryl compounds which may carry the diazonium group, forming the cation in the photosensitive aromatic diazonium salts having the formula shown above. In the above formula it will be understood that $n$ is equal to the oxidation state of the element M, and $m$ is equal to the number of halogen atoms which are given up upon exposure to actinic radiation to yield a Lewis acid, $m$ thus being the number of diazonium groups in the diazonium salt as determined by the net charge on the complex anion ($MX_{n+m}$).

Specific examples of photosensitive compounds which can be used in the present invention include:

p-nitrobenzenediazonium hexafluorophosphate
o-nitrobenzenediazonium hexafluorophosphate
2,5-dichlorobenzenediazonium hexafluorophosphate
p-N-morpholinobenzenediazonium hexafluorophosphate
2,5-diethoxy-4-(p-tolyl) benzenediazonium hexafluorophosphate
2-chloro-4-(dimethylamino)-5-methoxybenzenediazonium hexafluorophosphate
2,5-diethoxy-4(p-tolymercapto)benzenediazonium hexafluorophosphate
2,5-dimethoxy-4-N-morpholinobenzenediazonium hexafluorophosphate
2,5-diethoxy-4-ethoxyphenylbenzenediazonium hexafluorophosphate
p-nitrobenzenediazonium hexafluoroarsenate
p-N-morpholinobenzenediazonium hexafluoroarsenate
2,4-dichlorobenzenediazonium hexachloroantimonate
p-nitrobenzenediazonium hexafluoroantimonate
p-N-morpholinobenzenediazonium hexafluoroantimonate
2,5-dichlorobenzenediazonium hexachloroantimonate
2,5-dichlorobenzenediazonium hexafluoroantimonate
2,4-dichlorobenzenediazonium pentachlorobismuthate (III)
o-nitrobenzenediazonium pentachlorobismuthate (III)
2,4-dichlorobenzenediazonium tetrachloroferrate III The diazonium compounds of the present invention may be prepared from procedures known in the art and such preparation forms no part of the present invention. Thus the chlorometallic complexes may be prepared for example in accordance with the method set forth by Lee et al. in Journal of the American Chemical Society, 83, 1928 (1961). Diazonium hexafluorophosphates can be prepared by diazotizing the corresponding aniline with $NOPF_6$, an $HCl-NaNO_2$ combination with subsequent addition of $HPF_6$ or a $PF^-_6$ salt, or by addition of such a hexafluorophosphate salt to another diazonium salt to effect precipitation. The N-morpholino complexes can be prepared either from the aniline derivative or by adding an aqueous solution of the desired inorganic complex salt to a solution of N-morpholinobenzenediazonium fluoroborate.

The epoxy monomers which can be employed in the present invention can be defined by the following formula:

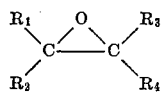

where $R_1$, $R_2$, $R_3$, and $R_4$ can be alkyl, aryl, alkoxy, alkenyl and hydrogen. Specific examples of such monomers include, but are not limited to, ethylene oxide and homologues thereof; glycidic (glycidate and glycidyl (2,3-epoxypropyl) esters; glycidyl methacrylates, acrylates and crotonates; and allyl glycidyl ethers. Additionally, commercial synthetic resins as heretofore defined can be employed. Examples of such resins can be those derived from the diglycidyl ether of bisphenol A, epoxidized polyolefins and epoxylated novolacs. Combinations of the above epoxies may be used and additionally they may be in solid or liquid forms.

The overall reaction which occurs in carrying out the present invention can be depicted by the following equations:

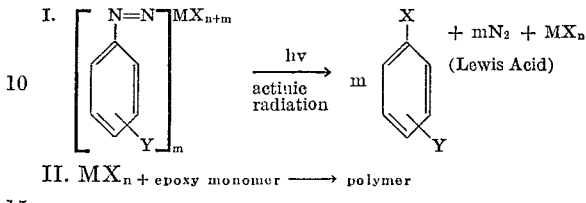

II. $MX_n$ + epoxy monomer $\longrightarrow$ polymer where $MX_{n+m}$ is a complex anion as defined previously, and Y is as defined previously. It will be seen that in Equation I, exposure of the particular aryldiazonium photosensitive compound of the present invention produces a Lewis Acid represented by the formula $MX_n$. By Lewis Acid is meant an electron pair acceptor such as $PF_5$, $FeCl_3$, $AsF_5$, $SbF_5$, $SnCl_4$ and $BiCl_3$. The Lewis Acid produced in Equation I initiates or catalyzes the photopolymerization process depicted in Equation II, wherein the epoxy monomer is polymerized as the result of the action of actinic radiation. While not essential to the functioning of the present invention, it is believed that certain intermediates such as carbonium ions are formed during photolysis of the diazonium compound which aid in the polymerization reaction.

A general application of the process embodied by Equations I and II can be as follows: a diazonium compound, as heretofore defined, is admixed, with or without the use of a suitable solvent, with an epoxy monomer. The mixture is thereafter coated on a suitable substrate such as a metal plate, plastic or paper. After evaporating solvent which may be present, the substrate is exposed to ultraviolet light through a mask or negative. When the light strikes the substrate the diazonium compound decomposes to yield a catalyst in the form of a Lewis Acid which initiates the polymerization of the epoxy monomer. The resulting polymer is resistive to most solvents and chemicals in the exposed areas. The unexposed areas can be washed away with suitable solvents to leave a reversal image in the form of an epoxy polymer.

The polymers produced by the method of the present invention are useful in a wide variety of applications in the field of graphic arts due to their superior abrasion resistance and adhesion to rigid, resilient, and flexible substrates such as metal, plastic, rubber, glass, paper, wood and ceramics; excellent resistance to most solvents and chemicals; and capability of forming high resolution images. In certain instances the polymerized epoxy monomer itself may serve as the substrate. Among such uses are in making acid and alkali resist images for chemical milling, gravure images, offset plates, flexographic printing, screenless lithography, printing plates, stencil making, microimages for printed circuitry, thermoset vesicular images, microimages for information storage, decoration of paper, glass, and metal packages and light cured coatings.

The source of actinic radiation in carrying out the present invention can be any suitable source as that produced from a mercury, xenon, carbon arc or tungsten filament lamp. The only limitations placed on the type of instrumentation used is that it must have a frequency range and energy level sufficient to impart to the monomer system energy at a high enough intensity to reach the decomposition level of the photosensitive compounds. Table I below lists some of the physical properties of the photosensitive compounds of the present invention including absorption maxima in acetonitrile.

TABLE I

| Complex type | Ring substituents | Decomposition melting point, °C.[1] | Absorption maxima, mμ [2] |
|---|---|---|---|
| Hexachlorostannate IV $\begin{bmatrix} N=N \\ \phantom{}\\ \text{(phenyl)} \end{bmatrix}_2 SnCl_6$ | 2,4-dichloro<br>p-Nitro | 190<br>126 | 285<br>258, 310 |
| Tetrachloroferrate III<br>N=N FeCl₄<br>(phenyl) | 2,4-dichloro<br>p-Nitro | 62-64<br>93-95 | 259, 285, 360<br>243, 257, 310, 360 |
| Hexafluorophosphate<br>N=N PF₆<br>(phenyl) | p-Chloro<br>p-Nitro<br>p-(N-morpholino)<br>2,4,6-trichloro<br>2,4,6-tribromo<br>2,5-dimethoxy-4 (p-tolyl)<br>2,5-diethoxy-4-p-tolylmer-capto<br>2,5-dimethoxy-4-N-morpholino<br>2,5-diethoxy-4-p-ethoxyphenyl<br>2-chloro-4-dimethylamino-5-methoxy | 162-164<br>156<br>162<br>240-250<br>237-250<br>167<br>147<br>135<br>136<br>111 | 273<br>258, 310<br>377<br>294, 337<br>306<br>210, 405<br>247, 400<br>266, 396<br>265, 415<br>273, 405 |
| Hexafluoroarsenate V<br>N=N AsF₆<br>(phenyl) | p-Nitro<br>p-(N-morpholino) | 141-144<br>162 | 257, 315<br>257, 378 |
| Hexafluoroantimonate V<br>N=N SbF₆<br>(phenyl) | p-Nitro<br>2,5-dichloro<br>p-(N-morpholino) | 140-141<br>161-162.5<br>153 | 257, 308<br>238, 358<br>254, 374 |
| Hexachloroantimonate V<br>N=N SbCl₆<br>(phenyl) | 2,4-dichloro | 178-180 | 282, 322 |
| Pentachlorobismuthate (III) $\begin{bmatrix} N=N \\ \phantom{}\\ \text{(phenyl)} \end{bmatrix}_2 BiCl_5$ | 2,4-dichloro<br>o-Nitro | 193.5, 195<br>166.5, 168 | 285, 313<br>285, 313 |

[1] Higher melting points can be obtained in differential thermal analysis apparatus under nitrogen.
[2] In acetonitrile.

The procedures for admixing the photosensitive compounds of the present invention with epoxy monomers are relatively simple and can be carried out in the following manner. An epoxy monomer, resin or prepolymer as heretofore defined containing oxirane groups is combined with a photosensitive aryldiazonium compound of the present invention. Suitable inert solvents may be employed if desired in effecting this mixture. By a suitable inert solvent is meant one that does not react appreciably with the monomer or the aryldiazonium compound before exposure to actinic radiation. Examples of such solvents include acetone, acetonitrile, butyronitrile, benzonitrile, toluene, xylene, methyl ethyl ketone, Cellosolve ether, monochlorobenzene, tetrachloroethane, o-dichlorobenzene, and propylene carbonate. Mixtures of these solvents have been found useful in the present invention. Furthermore, a liquid epoxy may serve as solvent for another epoxy, liquid or solid in nature. It is to be understood, however, that the use of solvents is not mandatory in carrying out the present invention, as illustrated in Examples XIX–XXI hereinbelow, wherein the benzenediazonium latent catalyst is dissolved in a liquid prepolymer itself. The exact amount of solvent necessary will depend upon the particular photosensitive compound employed. However, the solvent conveniently may be used in sufficient quantity to dissolve both the aryldiazonium compound and the epoxy monomer.

The amount of photosensitive compound employed in the admixture need not be specifically ascertained but is generally related to the amount of epoxy monomer being polymerized. It has been found that quite satisfactory results are obtained by using from about one to about ten parts by weight of aryldiazonium compound to each one hundred parts by weight of the dry epoxy monomer. Additionally, the photosensitivity of the diazonium compound, and hence the speed of photopolymerization may be further enhanced by the inclusion of certain photosensitizers known in the art of the chemistry of diazonium compounds. Among such sensitizers, but not limited to these, are anthraquinone, 1-chloroanthraquinone, primuline, acenaphthylene, naphthalene and anthracene.

The following examples will further serve to illustrate the present invention.

EXAMPLES I–VI

In order to demonstrate the versatility of diazonium-catalyzed photoresist systems of the present invention a number of epoxies of different types were studied. The procedure used was to make up a solution of the epoxy in a solvent such as acetone, acetonitrile, methyl ethyl ketone, toluene or Cellosolve ether and add an aryldiazonium catalyst to this solution from between 3 to 5% by weight (based on dry epoxy monomer weight). The aryldiazonium compounds used were p-nitrobenzenediazonium hexafluorophosphate;
o-nitrobenzenediazonium hexafluorophosphate;
2,5-dichlorobenzenediazonium hexafluorophosphate;
p-N-morpholinobenzenediazonium hexafluorophosphate;
2,5-dimethoxy-4-(p-tolyl)-benzenediazonium
   hexafluorophosphate;
2-chloro-4-(dimethylamino)-5-methoxybenzene-
   diazonium hexafluorophosphate;
2,5-diethoxy-4-(p-tolymercapto)benzenediazonium
   hexafluorophosphate;
2,5-dimethoxy-4-N-morpholinobenzenediazonium
   hexafluorophosphate;
2,5-diethoxy-4-p-ethoxyphenyl-benzenediazonium
   hexafluorophosphate;
p-nitrobenzenediazonium hexafluoroarsenate;
p-N-morpholinobenzenediazonium hexafluoroarsenate;
2,4-dichlorobenzenediazonium hexachloroantimonate;
p-nitrobenzenediazonium hexafluoroantimonate;
p-N-morpholinobenzenediazonium hexafluoroantimonate;
2,5-dichlorobenzenediazonium hexachloroantimonate;
2,5-dichlorobenzenediazonium hexafluoroantimonate;
2,4-dichlorobenzenediazonium pentachlorobis-
   muthate (III);
o-nitrobenzenediazonium pentachlorobismuthate (III);
2,4-dichlorobenzenediazonium tetrachloroferrate (III);
   and
p-nitrobenzenediazonium tetrachloroferrate (III).

In some cases it was necessary to add acetonitrile to the resulting mixture to fully dissolve the catalyst.

The solution was then coated onto dichromated aluminum by means of a draw bar, such as a Mayer rod, and allowed to dry in air. The coated plate was then exposed imagewise to light from a Gates Raymaster 360 Watt Uniarc lamp. A contact-copy was made of a negative bar chart image. Exposure time ranged from less than a minute to fifteen minutes, depending upon the activity of the resin and the catalyst.

Following exposure, the plate was developed by washing with acetone or methyl ethyl ketone to remove the unexposed soluble areas. The insoluble exposed areas remained on the plates, forming resist images. No heating was necessary prior to development with any of the epoxy compounds tested, with the exception of morpholino and amino (e.g. dimethylamino)-substituted benzenediazonium initiators which required heating at approximately 100° C. for about three minutes to insure good results. However, the developed resist image was generally heated to 180° C. for fifteen to thirty minutes in order to insure complete curing of the polymer.

Table II below summarizes some of the epoxy compounds treated by the above process. The image quality was judged on the basis of how well it adhered to the metal surface during development, the resolution of the lines of the image, and how well the unexposed areas washed off.

TABLE II

| Epoxy | Type | Average molecular weight | Epoxy equivalent weight | Image quality |
|---|---|---|---|---|
| Dicylopenta-diene dioxide. | Alicyclic monomer. | 162.2 | 81.1 | Fair. |
| Glycidyl methacrylate allyl glycidyl ether copolymer. | Polyvinyl epoxy prepolymer. | | | Good-excellent. |
| Ciba araldite 6084[1]. | Bis-phenol-A glycidyl ether polymer. | | 857–1,025 | Do. |
| Ciba ECN 1273 [1]. | Epoxy-Cresol Novolac. | 1,080 | 225 | Fair-good. |
| Ciba ECN 1299 [1] | ___do___ | 1,270 | 235 | Good-excellent. |
| Shell Epon 1009 [2] (with 10% Ciba ECN 1299). | Bis-phenol-A glycidyl ether polymer. | | 2,500–4,000 | Good. |

[1] Sold commercially by Ciba Pharmaceutical Products, Inc., Summit, New Jersey.
[2] Sold commercially by Shell Chemical Corporation, New York, N.Y.

The epoxy compounds listed in Table II illustrate the variety of commercial epoxy compounds suitable for use in the present invention; however, the epoxy compounds listed in the above table are by no means limiting. Additionally, although the epoxy compounds listed above are solid, the process of the present invention can also be used to photopolymerize liquid epoxy monomers. Additionally, depending upon the desired application, various formulations can be made using one or more of the aryldiazonium compounds of the present invention along with one or more epoxy compounds.

EXAMPLE VII

A photoresist plate suitable for acid etching was prepared in the following manner. A solution consisting of 97 grams of 60% ECN 1299, as defined in Table II, in toluene, 95 ml. of acetonitrile and 2.91 grams of p-chlorobenzenediazonium hexafluorophosphate was prepared. A square steel plate was coated with the solution. The solution was diluted with toluene as needed. The plate was then exposed through a photographic negative pattern of crosses to a carbon arc for ten minutes at a distance of three feet. The plate was thereafter washed with acetone. The raised crosses that were left on the plate were firm enough to be rubbed with the finger while still immersed in the solvent. The plate was heated for fifteen minutes at 180° C. to insure complete curing and thereafter treated with nitric acid. Although the steel plate was eaten completely through in some places, the resist surface was unharmed by the acid, with very little undercutting occurring.

EXAMPLE VIII

A photoresist plate was prepared by the procedures set forth in Example VII except that the exposed plate was heated at 100° C. for 3 minutes prior to development with acetone. The following coating solution was employed: 30.5 grams of 50% ECN 1299, as defined in Table II, in o-chlorotoluene; 50 ml. of butyronitrile; and 0.763 gram of p-N-morpholinobenzenediazonium hexafluorophosphate. The results obtained upon acid etching of the plate were similar to those obtained in Example VII.

EXAMPLE IX

A multilith plate was prepared as follows: a mixture containing 600 grams of Araldite 6084 and 66.7 grams of ECN 1299 as defined in Table II, 400 grams of toluene and 100 grams of methyl ethyl ketone was prepared. To 58 grams of this solution was added 25 ml. of acetonitrile and 1.66 grams of p-chlorobenzenediazonium hexafluorophosphate. The resulting solution was diluted with toluene and Cellosolve acetate as needed. A blank aluminum multilith plate which had been stripped of its coating was coated with this mixture. The plate was then exposed imagewise through a facsimile test chart negative for seven minutes to a carbon arc at thirty inches. The plate was thereafter washed in methyl ethyl ketone and heated for fifteen minutes at 180° C., to ensure complete curing. The images on the test chart consisted of converging lines and print, as well as closely spaced lines and half-tone images, all of which were completely reproduced on the plate. After cleaning off the non-coated portion of the plate with putz pomade, excellent multilith copies were obtained. Similar plates were prepared employing a caustic treatment in place of putz pomade. It will be understood that multilith presses utilize lithographic plates which are ink-receptive in the image areas to be printed, these areas being the exposed or unscreened surface portions of the plate which carry the epoxy polymer cured to an ink-receptive, insoluble adherent form as a result of the radiation passing through the corresponding clear areas of the test chart negative, the uncured coating being dissolved and washed away by the methyl ethyl ketone solvent in the unexposed surface areas to develop the lithographic printing plate.

EXAMPLE X

A multilith formulation suitable for spraying was prepared as follows: To a solution containing 30.5 grams of 50% ECN 1299, as defined in Table II, in monochlorobenzene, 0.763 gram of p-chlorobenzenediazonium hexafluorophosphate and 10 ml. of acetonitrile was added 80 ml. of monochlorobenzene and 15 ml. of acetonitrile. The resulting solution was used to spray a smooth coating on aluminum multilith plates. The plate was exposed for three minutes through a half-tone negative to a Gates ultraviolet lamp at 22 cm. distance. The plate was subsequently washed with methyl ethyl ketone to give an excellent raised positive image copy of the half-tone. The plate was heated at 180° C. for fifteen minutes to ensure complete curing.

EXAMPLE XI

In order to demonstrate the superior catalytic activity of compounds in the present invention as opposed to that of in the prior art compounds the following solutions were prepared:

(A) 5 grams of 53.5% ECN 1299 (defined in Table II) solution in toluene:

0.0134 gram of p-nitrobenzenediazonium hexafluorophosphate (equal to 0.5% of epoxy by weight) 2 ml. acetonitrile.

(B) 5 grams of 53.5% ECN 1299 solution in toluene: 0.0134 gram of p-nitrobenzenediazonium fluoroborate 3 ml. acetonitrile.

(C) 5 grams of 53.5% ECN 1299 solution in toluene: 0.0804 gram of p-nitrobenzenediazonium fluoroborate (equal to 3% of epoxy by weight) 6 ml. acetonitrile.

Each of the solutions was used to coat a strip of bare aluminum with a draw bar. The dried coatings were exposed to a xenon lamp through a Kodak #2 step tablet, at 32 inches distance for 5 minutes. Following the exposure, the strips were washed with acetone, and the length of remaining epoxy polymer film corresponding to the number of steps reproduced was determined. Plates coated with solutions A and C each had 7 steps, while the plate coated with solution B had all of the coating washed off. It will be seen therefore that since coatings A and B had equal amounts of catalytic material (coating A employing a compound of the present invention, and coating B employing a compound of the prior art) and coating C has six times the amounts employed in A and B, the catalyst activity and resulting efficiency of the diazonium compounds of the present invention are far superior to those heretofore known.

EXAMPLE XII

A photoresist plate suitable for acid etching was prepared in the following manner. A solution consisting of 30.5 g. of 50% ECN 1299 in o-chlorotoluene, 50 ml. of butyronitrile and 0.73 g. of p-N-morpholinobenzenediazonium hexafluorophosphate was used to coat a square steel plate. The dried coating was exposed to a 360W Gates Raymaster Uniarc lamp through a bar target negative for fifteen seconds. The exposed areas changed in color from yellow to colorless. After three minutes heating at 100° C. following the exposure, the resist image developed very quickly when held over boiling trichloroethylene. An excellent photoresist image remained on the plate. In order to insure complete curing, the developed plate was finally heated at 180° C. for fifteen minutes. When immersed in 1:1 diluted nitric acid, the photoresist image and metal directly under it were not harmed by the acid, although the metal was eaten away where there was no photoresist.

EXAMPLE XIII

A multilith plate was prepared as follows: A solution consisting of 5 g. of 50% ECN 1299 in o-chlorotoluene, 0.150 g. of p-N-morpholinobenzenediazonium hexafluorophosphate, 4 ml. of acetonitrile, was used to coat a blank aluminum multilith plate. After drying, the coated plate was exposed through a half-tone negative to a xenon lamp for 30 seconds. Following the exposure, the plate was heated at 100° C. for three minutes. When developed with methyl ethyl ketone, an excellent reversal copy of the half-tone image was left on the plate, corresponding to the clear areas of the negative. The unexposed portions of the coating were washed away.

EXAMPLE XIV

This example illustrates the application of the photosensitive initiator over the epoxy coating just prior to exposure. A solution of 5 g. of 50% ECN 1299 in monochlorobenzene was diluted with 25 ml. of toluene. The resulting solution was used to coat an aluminum plate. After drying, a solution of 0.10 g. of p-nitrobenzenediazonium hexafluorophosphate was sprayed onto the epoxy coating. The dried, coated plate was exposed through a transparency image to a Gates Raymaster Uniarc lamp for 3 minutes, and then developed in acetone. A photopolymer image remained on the plate.

EXAMPLE XV

This illustrates the preparation of a steel screen photoresist image. A solution consisting of 10 ml. of araldite 488E-32 a commercially available epoxy resin, and 5 ml. of methyl ethyl ketone was used to coat a steel mesh screen of the type used in bottle-printing. A solution of 0.20 g. of p-nitrobenzenediazonium hexafluorophosphate was then coated over the dried araldite coating. When dry, the coated screen was then exposed imagewise to a Gates Raymaster Uniarc lamp for 4 minutes. Development in methyl ethyl ketone left a resist image. This example illustrates the manner in which an epoxy solvent system, generally incompatible with an initiator, may be adapted for use with that initiator. The initiator may thus be applied over the epoxy film after the incompatible solvents have been evaporated off.

EXAMPLE XVI

This example illustrates the preparation of an epoxy photopolymer image coating on paper for use as a printing stencil. A sheet of tissue paper was impregnated with a solution consisting of: 16.25 g. of 50% ECN 1299 in monochlorobenzene, 22.5 ml. of butyronitrile, 35 ml. of acetonitrile, 17.5 ml. of additional monochlorobenzene, 0.225 g. of p-nitrobenzene diazonium hexafluorophosphate. After drying, the impregnated paper was exposed through a transparency image of printed matter and a half-tone to a Gates Raymaster lamp, for 2 minutes, and then developed in acetone. A reversed photoresist image of the copy was left on the paper. The image on the paper was duplicated by superimposing the stencil on a sheet of ordinary paper, and wiping over it with an aqueous dye solution. Thus a positive copy of the original was obtained.

EXAMPLE XVII

This example illustrates the preparation of an epoxy photopolymer relief image on a plastic substrate. A solution was prepared consisting of 10 g. of 50% ECN 1299 in toluene, 6 ml. acetonitrile, and 0.250 g. of 2,5-diethoxy-4 - mercaptophenylbenzene diazonium hexafluorophosphate. A coating was drawn on Mylar D film and exposed through a negative transparency of printed matter for one minute to a Gates Raymaster lamp. Development in acetone yielded a positive relief image on the Mylar. When the image source was a positive transparency, a negative gravure image was obtained. When the image source was a negative half-tone transparency, a positive relief image was obtained.

EXAMPLE XVIII

This example illustrates the preparation of etched gravure and relief images on aluminum. A formulation similar to that of Example XVII was used to coat samples of aluminum plate. One coated plate was exposed through a positive printed matter transparency to a Gates Raymaster lamp for one minute. Another coated plate was similarly exposed, but through a negative transparency. Both were developed in acetone. The first plate yielded a negative photoresist copy of the printed matter, while the second plate yielded a positive copy of the printed matter. Both plates were etched with 30% sodium hydroxide solution. The negative photoresist, after etching, yielded a gravure image, with only the image portion of the plate being etched away. The background was unharmed. The positive photoresist, after etching, yielded a raised relief image, with only the background, or non-image portion of the plate being etched away. The image portions were unharmed.

EXAMPLES XIX–XXI

These examples illustrate the photopolymerization of liquid monomers and liquid solutions of solid and liquid monomers.

EXAMPLE XIX

Photopolymerization of a liquid monomer, glycidyl acrylate. A mixture of 0.125 g. of p-chlorobenzene diazonium hexafluorophosphate and 5 g. of glycidyl acrylate was placed in an aluminum dish cooled to 0° C. The dish and contents were exposed to a Gates Raymaster lamp for 30 seconds, and then left at room temperature in the dark. After 30 minutes polymerization had taken place yielding a solid with no monomer odor. A control sample that was not exposed to light lasted at least 24 hours before polymerizing.

EXAMPLE XX

Photocopolymerization of a solution of ECN 1273 in glycidyl acrylate. A mixture of 5 g. each of ECN 1273 and glycidyl acrylate, and 0.500 g. of p-chlorobenzenediazonium hexafluorophosphate was used to coat an aluminum plate. The liquid coating on the plate formed a hard, glossy film within 30 seconds of exposure to a Gates Raymaster lamp.

EXAMPLE XXI

Photocopolymerization of a solution of ECN 1273 in 1,2 epoxy-3-phenoxypropane. A solution of 5 g. of ECN 1273 and 5 g. of 1,2 epoxy-3-phenoxypropane was mixed with 0.500 g. of p-chlorobenzenediazonium hexafluorophosphate, and used to make a liquid coating on an aluminum plate. The coating became hard and glossy after 30 seconds of exposure to a Gates Raymaster lamp.

EXAMPLE XXII

This example illustrates the use of photosensitizers to further enhance the photopolymerization process of the present invention. Four solutions were prepared, each consisting of 5 g. of 53.5% ECN 1299 in toluene, 2 ml. of acetonitrile, and 0.134 g. of p-chlorobenzenediazonium hexafluorophosphate. To each of three of these solutions was added 0.0015 g. of one of the three sensitizers, namely anthraquinone, 1-chloroanthraquinone, and acenaphthylene. They were used to coat separate samples of stripped 3M aluminum plate, using the No. 26 Mayer rod. After drying, they were exposed through a Kodak No. 2 step tablet (21 steps from D=0.05 to D=1.35) to a xenon lamp for 5 minutes at 32 inches distance. They were then developed in acetone.

The length of the epoxy film remaining on the aluminum sample was then measured, and correlated with the number of steps of the step tablet which allowed sufficient light transmission during the exposure to effect photopolymerization and insolubilization. The number of steps obtained in each case was:

No sensitizer, 7 steps
Anthraquinone, 10 steps
1-chloroanthraquinone, 9 steps
Acenaphthylene, 10+ steps These figures are average values derived from several repeat tests.

Although the invention has been described and illustrated in detail, it is to be understood that the same is by way of illustration and example only and is not to be taken by way of limitation, the spirit and scope of this invention being limited only by the terms of the appended claims.

What is claimed is:

1. A composition of matter comprising, in admixture:
   an epoxy monomer or prepolymer;
   and, as a latent curing agent therefor, an aromatic diazonium salt of a complex anion, said anion being selected from the group consisting of hexachloroantimonate(V), hexafluoroantimonate(V), hexafluoroarsenate(V), pentachlorobismuthate(III), tetrachloroferrate(III), hexachlorostannate(IV), and hexafluorophosphate.

2. The composition of matter of claim 1, in which said anion of the aromatic diazonium salt is hexafluorophosphate.

3. As an article of manufacture, a composite sheet, comprising:
   a support; and, in surface contact therewith,
   a light-responsive organic-solvent-soluble layer of substantially uniform thickness containing, in admixture, an epoxy monomer or prepolymer and, as a latent curing agent for polymerizing and insolubilizing said epoxy monomer or prepolymer, an aromatic diazonium salt of a complex anion, said anion being selected from the group consisting of hexachloroantimonate(V), hexafluoroantimonate(V), hexafluoroarsenate(V), pentachlorobismuthate(III), tetrachloroferrate(III), hexachlorostannate(IV), and hexafluorophosphate, and said latent curing agent having had substantially no exposure to actinic radiation.

4. The composite sheet of claim 3, in which the latent curing agent is an aromatic diazonium hexafluorophosphate.

5. The article of manufacture of claim 3, in which said support is suitable for forming a printing surface on the surface carrying said light-responsive layer, said aromatic diazonium salt in said layer being adapted, upon irradiation of image areas of said surface, to polymerize the epoxy monomer or prepolymer in said areas to an ink-receptive cured product.

6. The process of curing an epoxy monomer or prepolymer to a hard, organic-solvent-insoluble mass, comprising:

forming a mixture of said monomer or prepolymer with a latent curing agent which has had substantially no exposure to actinic radiation, said curing agent comprising an aromatic diazonium salt of a complex anion, said anion being selected from the group consisting of hexachloroantimonate(V), hexafluoroantimonate(V), hexafluoroarsenate(V), pentachlorobismuthate(III), tetrachloroferrate(III), hexachlorostannate(IV), and hexafluorophosphate;

and subjecting at least predetermined portions of said mixture to actinic radiation of sufficient intensity and duration to effect curing of said monomer or prepolymer.

7. The process of claim 6, in which said monomer or prepolymer is mixed with a latent curing agent in the form of an aromatic diazonium hexafluorophosphate.

8. A process for polymerizing epoxy monomers or prepolymers which comprises mixing with said epoxy monomers or prepolymers photosensitive aryldiazonium compounds having the formula:

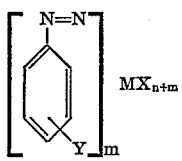

where $MX_{n+m}$ is a halogen containing complex anion selected from the group consisting of hexachlorostannate IV, tetrachloroferrate III, hexafluorophosphate, hexafluoroarsenate V, hexachloroantimonate V and pentachlorobismuthate III, and where X is the halogen, $n$ is the oxidation state of M, $m$ is the number of diazonium groups in the diazonium compound as determined by the net charge on said complex anion, and Y is selected from at least one of the group consisting of halogen, nitro, N-morpholino, alkyl, alkoxy, aryl, amino, arylamino, alkylamino and arylmercapto radicals; and subsequently exposing the mixture to electromagnetic radiation of predetermined intensity and frequency to effect said polymerization.

9. The process of claim 8 wherein the mixture contains from about 1 percent to about 10 percent by weight of photosensitive aryldiazonium compound based on the dry weight of the epoxy monomer or prepolymer.

10. The process of claim 8 wherein the mixing of the epoxy monomer or prepolymer and the aryldiazonium compound is effected by use of a solvent.

11. The process of claim 10 wherein the solvent is selected from the group consisting of aromatic hydrocarbons, ring-halogenated aromatic hydrocarbons, acetonitrile, butyronitrile, benzonitrile, methyl ethyl ketone, acetone, esters and ethers.

12. The process of claim 8 wherein the mixture of epoxy monomer or prepolymer and photosensitive aryldiazonium compound is subjected to heat after said exposure to said electromagnetic radiation.

13. The process of claim 8 wherein the photosensitivity of the aryldiazonium compound is increased by adding a photosensitizer.

14. The process of claim 13 wherein the photosensitizer is selected from the group consisting of anthraquinone, 1-chloroanthraquinone, and acenaphthylene.

15. A process for polymerization of epoxy monomers or prepolymers which comprises mixing with said epoxy monomers or prepolymers photosensitive aryldiazonium compounds having the formula:

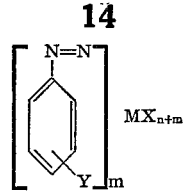

where $MX_{n+m}$ is a halogen containing complex anion selected from the group consisting of hexachlorostannate IV, tetrachloroferrate III, hexafluorophosphate, hexafluoroarsenate V, hexachloroantimonate V, hexafluoroantimonate V and pentachlorobismuthate III, and where X is the halogen, $n$ is the oxidation state of M, $m$ is the number of diazonium groups in the diazonium compound as determined by the net charge on said complex anion, and Y is selected from at least one of the group consisting of halogen, nitro, N-morpholino, alkyl, alkoxy, aryl, amino, arylamino, alkylamino and arylmercapto radicals; applying said mixture to a surface area; screening predetermined portions of said surface area; exposing the unscreened surface area to electromagnetic radiation of predetermined intensity and frequency to effect said polymerization; removing said screening means; and thereafter applying a suitable solvent for removal of unpolymerized portions of said mixture.

16. The process of claim 15 wherein the mixing of the epoxy monomer or prepolymer and the aryldiazonium compound is effected by use of a solvent.

17. The process of claim 16 wherein the solvent is selected from the group consisting of aromatic hydrocarbons, ring-halogenated aromatic hydrocarbons, acetonitrile, butyronitrile, benzonitrile, methyl ethyl ketone, esters and ethers.

18. The process of claim 15 wherein the mixture is subjected to heat after exposure to said electromagnetic radiation.

19. The process of claim 15 wherein the photosensitivity of the aryldiazonium compound is increased by adding a photosensitizer.

20. The process of claim 19 wherein the photosensitizer is selected from the group consisting of anthraquinone, 1-chloroanthraquinone, and acenaphthylene.

21. The process of claim 15 wherein the mixture contains from about 1 percent to about 10 percent by weight of photosensitive aryldiazonium compound based on the dry weight of the epoxy monomer.

22. The process of claim 15, in which the surface area to which said mixture is applied is the surface of a substrate suitable for forming a printing surface, and in which the application of said solvent develops a lithographic printing plate carrying cured ink-receptive polymer on the exposed unscreened surface portions thereof.

23. The process of claim 22, in which said photosensitive compound in the mixture applied to said surface is an aromatic diazonium hexafluorophosphate.

24. A method of preparing a photoresist image which comprises admixing an epoxy monomer or prepolymer with a photosensitive aryldiazonium compound having the formula:

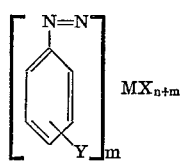

where $MX_{n+m}$ is a halogen containing complex anion selected from the group consisting of hexachlorostannate IV, tetrachloroferrate III, hexafluorophosphate, hexafluoroarsenate V, hexachloroantimonate V, hexafluoroantimonate V and pentachlorobismuthate III, and where X is the halogen, $n$ is the oxidation state of M, $m$ is the number of diazonium groups in the diazonium compound as determined by the net charge on said complex anion, and Y is selected from at least one of the group consisting of halogen, nitro, N-morpholino, alkyl, alkoxy, aryl, amino, arylamino, alkylamino and arylmercapto radicals; applying said mixture to a substrate; screening predetermined portions of said substrate; exposing the unscreened substrates to electromagnetic radiation of predetermined intensity and frequency to effect polymerization of said epoxy monomer; removing said screening means; and applying a suitable solvent to remove unpolymerized portions of said mixture.

25. The method of claim 24 wherein the mixture is subjected to heat after exposure to said electromagnetic radiation.

26. A method according to claim 24 wherein the substrate is selected from the group consisting of metal plate, rubber, plastic films, paper, wood, wire screen, ceramic, and glass.

27. The method of claim 24 wherein the substrate is the polymerized epoxy monomer or prepolymer.

References Cited
UNITED STATES PATENTS

| | | | |
|---|---|---|---|
| 3,205,157 | 9/1965 | Licari | 96—91 X |
| 3,295,974 | 1/1967 | Erdmann | 96—91 X |
| 1,825,729 | 10/1931 | Hentrich et al. | 260—142 |
| 3,203,803 | 8/1965 | Habib | 96—91 |
| 3,155,513 | 11/1964 | Sorensen | 96—91 |

RONALD H. SMITH, Primary Examiner

U.S. Cl. X.R.

96—35.1, 75, 91 R, 115 R, 115 P; 204—159.18, 159.23